UNITED STATES PATENT OFFICE.

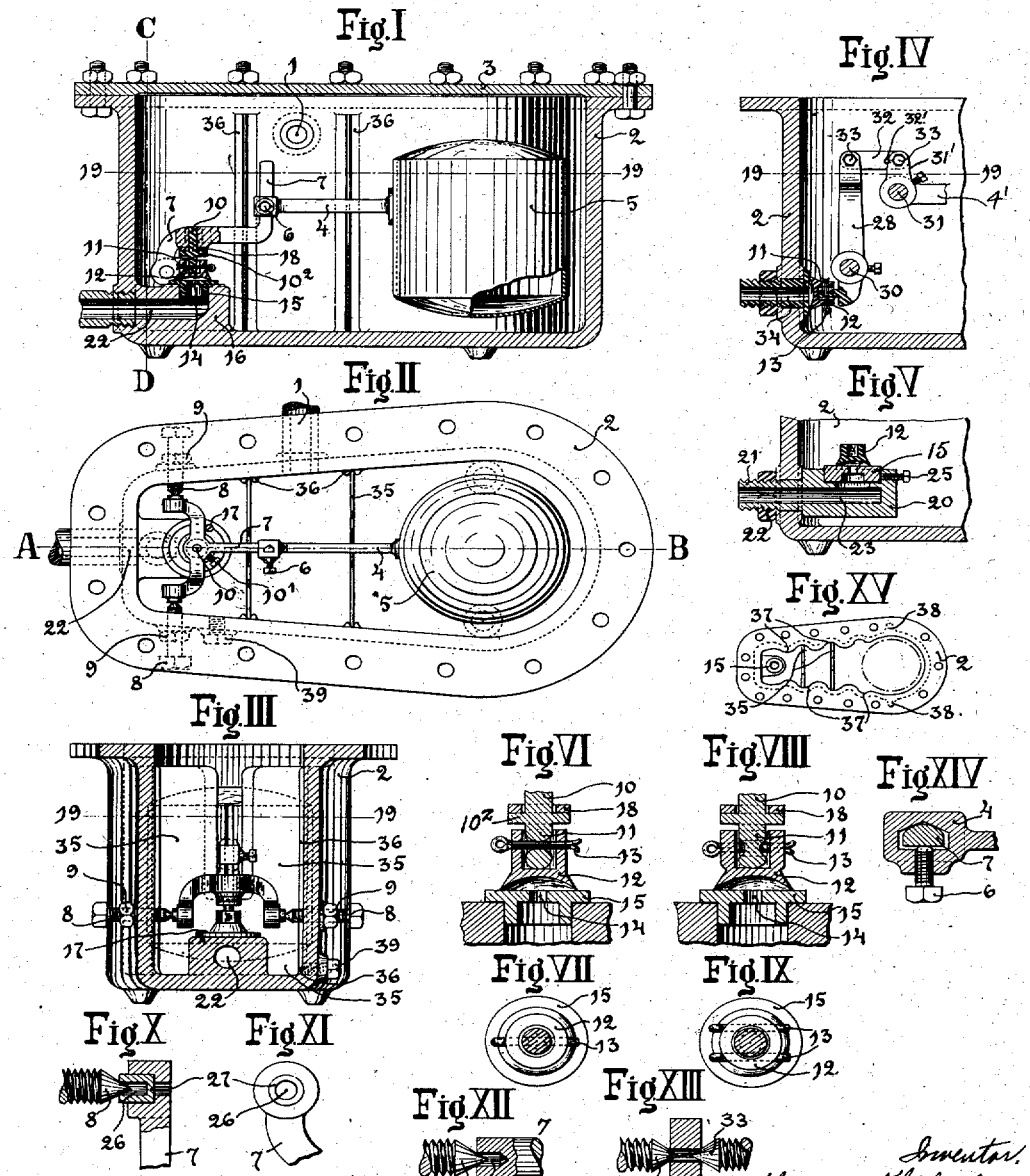

WLADIMIR KHLEBNIKON, OF ST. PETERSBURG, RUSSIA.

STEAM-TRAP.

SPECIFICATION forming part of Letters Patent No. 723,877, dated March 31, 1903.

Application filed October 12, 1901. Serial No. 78,488. (No model.)

*To all whom it may concern:*

Be it known that I, WLADIMIR KHLEBNIKON, a subject of the Emperor of Russia, residing at St. Petersburg, in the Russian Empire, have invented certain new and useful Improvements in Steam-Traps; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has relation to steam-traps having a float-controlled valve; and it has for its object the provision of means for regulating the normal level of water in the trap in accordance with the pressure that may normally exist therein, so that the trap is adapted for use under any pressure ranging from a very high pressure to one below atmospheric pressure.

The invention has for its further object the provision of means for counteracting the wash of the water in the trap when used on board ship and due to the pitching or rolling motion.

The invention has for its further object a peculiar construction of pot whereby its dimensions are reduced to a minimum relatively to a given capacity; and, lastly, the invention has for its object certain improvements in the construction of the discharge-valve and its actuating mechanism, as will now be fully described, reference being had to the accompanying drawings, in which—

Figure 1 is a vertical sectional view, taken on line A B of Fig. 2, of a steam-trap embodying my invention. Fig. 2 is a top plan view thereof, and Fig. 3 a section on line C D of Fig. 1 with the trap-covers removed. Figs. 4 and 5 are fragmentary sectional views illustrating modified arrangements of the discharge-port and of the valve controlling the same. Figs. 6, 7, 8, and 9 are fragmentary sectional detail views illustrating different modes of connecting the valve to its stem. Figs. 10, 11, 12, 13, and 14 are fragmentary detail views illustrating the mode of pivoting the valve-actuating levers, and Fig. 15 is a plan view of a trap-casing constructed for use under very high pressures.

The casing or pot 2 is preferably, though not necessarily, of horseshoe form, or substantially so, and has an encompassing flange at its upper edge to which the cover 3 is bolted fluid-tight, and said casing has formed on its bottom and end wall at the narrower end a raised portion 16, in which is formed an angular discharge-passage 22, to the outlet of which is connected the discharge-pipe for the water of condensation. In the inlet of passage 22, which is enlarged, is fitted fluid-tight a valve-seat 15, consisting of a tubular body having a flanged head in which is formed a port 14, the outer face of which head constitutes the valve-seat face, said valve-seat being secured against vertical displacement by means of one or more screws 17, Fig. 2, passing through the flange of the valve-seat into the raised portion 16. The valve-seat 15 may be secured in place by a set-screw 25, Fig. 5, passing through the end wall of the discharge-passage 22 and impinging upon the tubular portion of the seat, so that said seat can be turned and adjusted in its bearing, and thereby displace the valve-port 14 to a certain extent in a horizontal plane.

In a float-operated valve, as is well known, it is very difficult, if not impossible, to prevent the cutting of the valve into its seat, and consequently prevent leakage, especially when the valve 12 used, as in the construction shown, is a dished valve with a substantially knife-edge face, and to facilitate the removal of a cut valve-seat and the substitution of a new one I secure said valve-seat removably in its bearings.

The valve 12 is, as above stated, a dished valve with a substantially knife-edge face, the object of which is to prevent the lodgment of solid matter between the valve-face and its seat and to adapt the valve to dislodge such solid matter or to crush or cut it as it moves to its seat. To further this object, the valve 12 is not rigidly secured to its stem, but is articulated thereto. The valve-stem 10 has a flange or collar $10^2$ at a suitable point intermediate its ends, the lower portion 11 of said stem having a hole through it, the ends of which flare outwardly, while the end of said stem is rounded off or convex. Said valve 12 has a socket for the reception of the lower portion 11 of the stem and is connected thereto by a cotter-pin 13, passing through the walls of the socket and through the aforesaid hole, as shown more clearly in Figs. 6 and 7, so that the valve 12 has an oscillating motion in directions at right angles to each other on its pin 13. This may also be attained by the construction shown in Figs. 8 and 9, whereby the valve is also free to rotate about its stem. To this end the lower part 11 of the valve-stem has a peripheral circular groove, through which are passed two cotter-pins 13, on which the valve 12 can rock and with which it can rotate about its stem. The upper end of the valve-stem is secured to the horizontal member of an angular and forked lever 7, midway between the vertical branches of the diverging members, which latter are pivotally mounted in the pot at such a distance above the valve-seat 15 as to enable the valve to move in a direction substantially perpendicular to said seat. The horizontal member of the lever 7 has a vertical extension, and to this vertical portion is adjustably secured the rod 4 of a (preferably) metal float 5.

The valve-stem 10 may be secured to the lever 7 by screwing it thereto or by making it of sufficient length to project from the lever and screw-threading its outer end for the reception of a nut, the flange or collar $10^2$ forming not only an abutment whereby the stem is held against lateral displacement, but also constituting a means for varying the length of the valve-stem, and consequently the travel of the valve to and from its seat, by the interposition of one or more washers 18, Figs. 1, 6, and 8, so that by these means or the adjustability of the float on lever 7, or both, the normal level of the water in the pot can be regulated to any desired normal pressure.

In Figs. 1, 3, and 4 I have shown the valve-actuating appliances adjusted to unseat the valve when the level of the water rises above the line 19.

When the trap is under very high pressures, I strengthen the side walls thereof by corrugating the same, as shown at 37, Fig. 15, and when the trap is used on board ship I form vertical grooves 36 in the inner face of its opposite side walls, Figs. 1, 2, and 3, for the reception of partitions 35, two or more, having apertures therein at different levels for the passage of the horizontal arm of lever 7 and for the float-rod 4, which apertures should not be of much greater area than is necessary for the free play of the parts extending therethrough. When the side walls of the casing or pot 2 are corrugated, the partitions 35 can be inserted in the grooves formed thereby, as will be readily understood and as shown in Fig. 15. The object of these partitions 35 is to counteract the wash of the water in the pot due to the rolling and pitching of the ship, which would be liable to sway and even unseat the valve 12, and in order that the pot may be readily emptied I provide near its bottom a drain-port, normally closed by a screw-plug 39, the pot being connected to the space to be drained by pipe 1.

In apparatus of the kind under consideration it is of the utmost importance that the valve-actuating lever should respond to the slightest displacement of the float, and inasmuch as there is always more or less solid matter held in suspension in the water of condensation and liable to be precipitated on the lever-bearings, and thereby impede the oscillation of the lever, it is of obvious advantage to so construct these bearings as to reduce the frictional resistance to a minimum by correspondingly reducing the area of the surfaces in contact. On the other hand, these bearings are liable to speedy wear, so that it is also of advantage to so construct them that the wear may be readily taken up or compensated or so as to be readily removed and new bearings substituted, and thereby avoid the substitution of a new valve-lever. To these ends, and as clearly shown in Figs. 10 and 11, the lever-arms have formed therein an aperture 27, the outer portion of which is enlarged to form a seat for a bearing-box 26, into which projects a conical screw-pin 8, screwed through an opening in the lateral wall of the casing or pot and locked against rotation by a jam or lock nut 9. These bearing-boxes may contain a more or less solid lubricant—as, for instance, a graphite paste. By the means described the lever 7 can be readily adjusted so as to properly position the valve 12 relatively to the port 14, controlled thereby, and the wear of the cone-pins and bearing-boxes as readily taken up, while said boxes can be readily removed and others substituted. On the other hand, the area of the contacting surfaces is reduced to a minimum. Of course instead of the bearing-boxes 26 the lever 7 may have socket-bearings 26' formed therein, as shown in Fig. 12.

To facilitate the adjustment of the float-rod 4 on the vertical arm of lever 7, said arm is of a substantially prismatic form in cross-section, Fig. 14, the eye in the end of said float-rod being of corresponding form and secured to the lever-arm by means of a set-screw 6.

As will be seen, the float 5 lies in the wider end of the casing, while the valve-seat, valve, and forked end of lever 7 are arranged in the narrower end, so that the dimensions of the casing relatively to a given capacity are reduced to a minimum.

Instead of forming the discharge-passage 22 in a raised portion integral with the casing I may use a separate piece 20, Fig. 5, in which said passage is formed and which is provided with a recessed portion for the reception of the valve-seat 15 and with an externally-screw-threaded tubular extension screwing through an aperture in the end wall of the casing, and to which extension the discharge-pipe is screwed. On the other hand, the valve-seat may be formed on the inner end of a tubular piece 34, Fig. 4, screwing through an aperture in the aforesaid end wall, the valve 12 being suitably connected to the lower shorter arm of a straight lever 28, secured to a spindle 30, journaled on cone screw-pins, as above described. The free end of the longer arm of this lever is forked and has pivotally connected thereto a link 32 by means of cone screw-pins 33, projecting into a hole in said link, Fig. 13. The other end of the link is similarly pivoted to a radial arm 31′ on a shaft 31, also journaled on cone-pins screwed into the opposite side walls of the casing, to which shaft the float-rod 4′ is secured. The link 32 has a series of pivot-holes 32′, so that it is adjustable as to length, whereby the travel of the valve to and from its seat can be adjusted for purposes hereinbefore described.

From the above description the operation of the trap will be readily understood, and I may merely remark that inasmuch as the normal level of the water in the pot can be varied in accordance with the pressure of the steam in the space to be drained it will readily be understood that said level can be maintained at such a point as to keep the discharge-port sealed during the time the valve is off its seat whatever may be the pressure in the casing or pot. Hence the apparatus is not dependent solely upon the steam-pressure for the automatic discharge therefrom of the water of condensation. This being the case, it is evident that the apparatus can be used under any pressure from the highest admissible to atmospheric pressure or even below atmospheric pressure in those cases where the water is discharged into a vacuum, so that when properly adjusted the apparatus can be used for draining the low-pressure cylinder of triple-expansion engines. The apparatus will also operate very satisfactorily in case of sudden inrushes of large volumes of water of condensation in view of the fact that the discharge will be a correspondingly-rapid one, especially under steam-pressure. Finally the construction of the apparatus is such that it will work as effectually on a body in motion, as a ship, as on a fixed support.

For the purpose of adjusting the valve relatively to its seat through the valve-actuating lever 7, which ought to be accurately done, a small mirror by which the valve and valve-seat are reflected may be made use of, and to this end any suitable source of light placed without the pot may be employed.

In practice I provide the pot with a level-indicator and a pressure-gage for obvious purposes, and as these appliances are commonly known I have deemed it unnecessary to illustrate them.

Having thus described my invention, what I claim as new therein, and desire to secure by Letters Patent, is—

1. In a steam-trap, the combination with the discharge-port and a dished valve controlling the same; of a float-operated lever and a valve-stem connected thereto and articulated to the valve, for the purpose set forth.

2. In a steam-trap, the combination with the discharge-port and a valve having a substantially knife-edge valve-face controlling the same; of a float-operated lever and a valve-stem connected thereto and to the valve so as to adapt the latter to oscillate or rock on said stem, for the purpose set forth.

3. In a steam-trap, the combination with the discharge-port and a valve having a substantially knife-edge valve-face controlling the same; of a float-operated lever and a valve-stem connected thereto and to the valve so as to adapt the latter to oscillate or rock on and rotate about said stem, for the purpose set forth.

4. In a steam-trap, the combination with the casing, its discharge-port and valve controlled thereby; of a float-operated lever connected to the valve and cone screw-bearings on which said lever is mounted, said bearings projecting through the walls of the casing thereby permitting of ready and accurate adjustment thereof, as set forth.

5. In a steam-trap, the combination with the discharge-port lying in a horizontal plane and a dished valve of greater diameter than said port and controlling the same; of a float-operated angle-lever, a valve-stem rigidly connected thereto and articulated to the valve, and a float adjustably secured to the vertical member of said lever, for the purpose set forth.

6. In a steam-trap, the combination with the discharge-port lying in a horizontal plane and a dished valve of greater diameter than said port and controlling the same; of a float-operated angle-lever, a valve-stem rigidly connected thereto and articulated to the valve, means for varying the length of said stem, and a float adjustably secured to the vertical member of said lever, for the purpose set forth.

7. In a steam-trap, the combination with the casing having corrugated side walls, its discharge-port and a dished valve of greater diameter than and controlling said port; of a float-operated lever, a valve-stem connected thereto and articulated to the valve, and partitions dividing the casing into a plurality of chambers communicating with one another at different levels, for the purpose set forth.

8. In a steam-trap, the combination with the casing having corrugated opposite side walls, its discharge-port, and a valve controlling the same; of a float-operated lever connected to said valve, and partitions held in the grooves formed by said corrugations and dividing the casing into a plurality of chambers communicating with one another at different levels, for the purpose set forth.

9. In a steam-trap, the combination with the casing provided with an angular discharge-passage enlarged at its inlet end, a valve-seat 15 provided with a port, removably secured in said enlarged part, and a valve having a substantially knife-edge face controlling said port; of a forked angular lever, the vertical branches of the fork fulcrumed in the casing on opposite sides of the valve-seat, a valve-stem secured to the horizontal member of the lever and articulated to the valve, and a float adjustably secured to a vertical member projecting from said horizontal member of the lever, substantially as and for the purposes set forth.

10. In a steam-trap, the combination with the discharge-port, the valve and valve-actuating float-operated lever 7; of the valve-stem 10 securable to said lever and articulated to the valve, said stem provided with a collar $10^2$, for the purposes set forth.

11. In a steam-trap, the combination with the casing of substantially horseshoe shape in longitudinal cross-section, its discharge-port at the narrower end thereof, and a valve controlling said port; of a float-operated angular lever fulcrumed in the casing on opposite sides of the discharge-port and extending toward the wider end of the casing, a valve-stem connected thereto and to the valve, a float in said wider end of the casing and a float-rod adjustably connected to a vertical member of the lever, for the purpose set forth.

12. In a steam-trap, the combination with the discharge-port and a valve controlling the same, a float-operated lever, a valve-stem connected thereto and to the valve, of a plurality of partitions dividing said trap into chambers communicating with one another at different levels, the discharge-port and valve in one chamber and the operating-float in another chamber.

13. In a steam-trap, a casing provided with a plurality of partitions dividing it into chambers communicating with one another at different levels, a discharge-port and valve in one of said chambers and an operating-float connected with said valve in another chamber, for the purpose set forth.

In testimony that I claim the foregoing as my invention I have signed my name in presence of two subscribing witnesses.

WLADIMIR KHLEBNIKON.

Witnesses:
  W. STEININGER,
  H. A. LOVIAGUINE.

---

Correction in Letters Patent No. 723,877.

Affidavit having been filed showing that the name of the patentee in Letters Patent No. 723,877, granted March 31, 1903, for an improvement in "Steam-Traps," should have been written and printed *Wladimir Khlebnikow* instead of "Wladimir Khlebnikon," it is hereby certified that the proper correction has been made in the files and records pertaining to the case in the Patent Office, and should be read in the Letters Patent that the same may conform thereto.

Signed and sealed this 9th day of June, A. D., 1903.

[SEAL.]

F. I. ALLEN,
*Commissioner of Patents.* controlling said port; of a forked angular lever, the vertical branches of the fork fulcrumed in the casing on opposite sides of the valve-seat, a valve-stem secured to the horizontal member of the lever and articulated to the valve, and a float adjustably secured to a vertical member projecting from said horizontal member of the lever, substantially as and for the purposes set forth.

10. In a steam-trap, the combination with the discharge-port, the valve and valve-actuating float-operated lever 7; of the valve-stem 10 securable to said lever and articulated to the valve, said stem provided with a collar $10^2$, for the purposes set forth.

11. In a steam-trap, the combination with the casing of substantially horseshoe shape in longitudinal cross-section, its discharge-port at the narrower end thereof, and a valve controlling said port; of a float-operated angular lever fulcrumed in the casing on opposite sides of the discharge-port and extending toward the wider end of the casing, a valve-stem connected thereto and to the valve, a float in said wider end of the casing and a float-rod adjustably connected to a vertical member of the lever, for the purpose set forth.

12. In a steam-trap, the combination with the discharge-port and a valve controlling the same, a float-operated lever, a valve-stem connected thereto and to the valve, of a plurality of partitions dividing said trap into chambers communicating with one another at different levels, the discharge-port and valve in one chamber and the operating-float in another chamber.

13. In a steam-trap, a casing provided with a plurality of partitions dividing it into chambers communicating with one another at different levels, a discharge-port and valve in one of said chambers and an operating-float connected with said valve in another chamber, for the purpose set forth.

In testimony that I claim the foregoing as my invention I have signed my name in presence of two subscribing witnesses.

WLADIMIR KHLEBNIKON.

Witnesses:
W. STEININGER,
H. A. LOVIAGUINE.

---

Affidavit having been filed showing that the name of the patentee in Letters Patent No. 723,877, granted March 31, 1903, for an improvement in "Steam-Traps," should have been written and printed *Wladimir Khlebnikow* instead of "Wladimir Khlebnikon," it is hereby certified that the proper correction has been made in the files and records pertaining to the case in the Patent Office, and should be read in the Letters Patent that the same may conform thereto.

Signed and sealed this 9th day of June, A. D., 1903.

[SEAL.]

F. I. ALLEN,
*Commissioner of Patents.*

Affidavit having been filed showing that the name of the patentee in Letters Patent No. 723,877, granted March 31, 1903, for an improvement in "Steam-Traps," should have been written and printed *Wladimir Khlebnikow* instead of "Wladimir Khlebnikon," it is hereby certified that the proper correction has been made in the files and records pertaining to the case in the Patent Office, and should be read in the Letters Patent that the same may conform thereto.

Signed and sealed this 9th day of June, A. D., 1903.

[SEAL.]

F. I. ALLEN,
*Commissioner of Patents.*